Dec. 10, 1940.   W. W. McDOWELL   2,224,769
TABULATING MACHINE
Filed Dec. 12, 1935   7 Sheets-Sheet 2
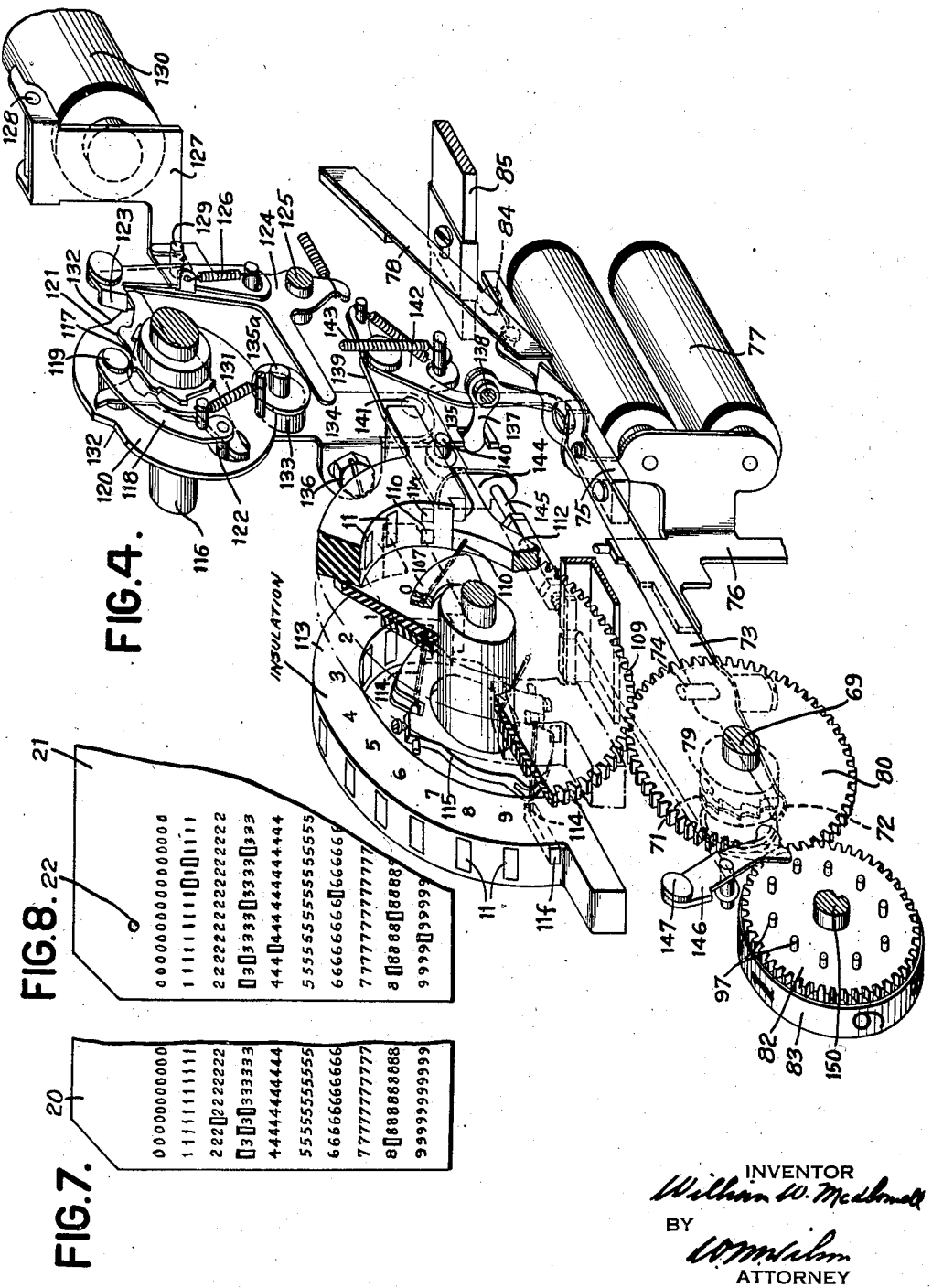
INVENTOR
William W. McDowell
BY
ATTORNEY Dec. 10, 1940.      W. W. McDOWELL      2,224,769
TABULATING MACHINE
Filed Dec. 12, 1935      7 Sheets-Sheet 3
FIG.5.
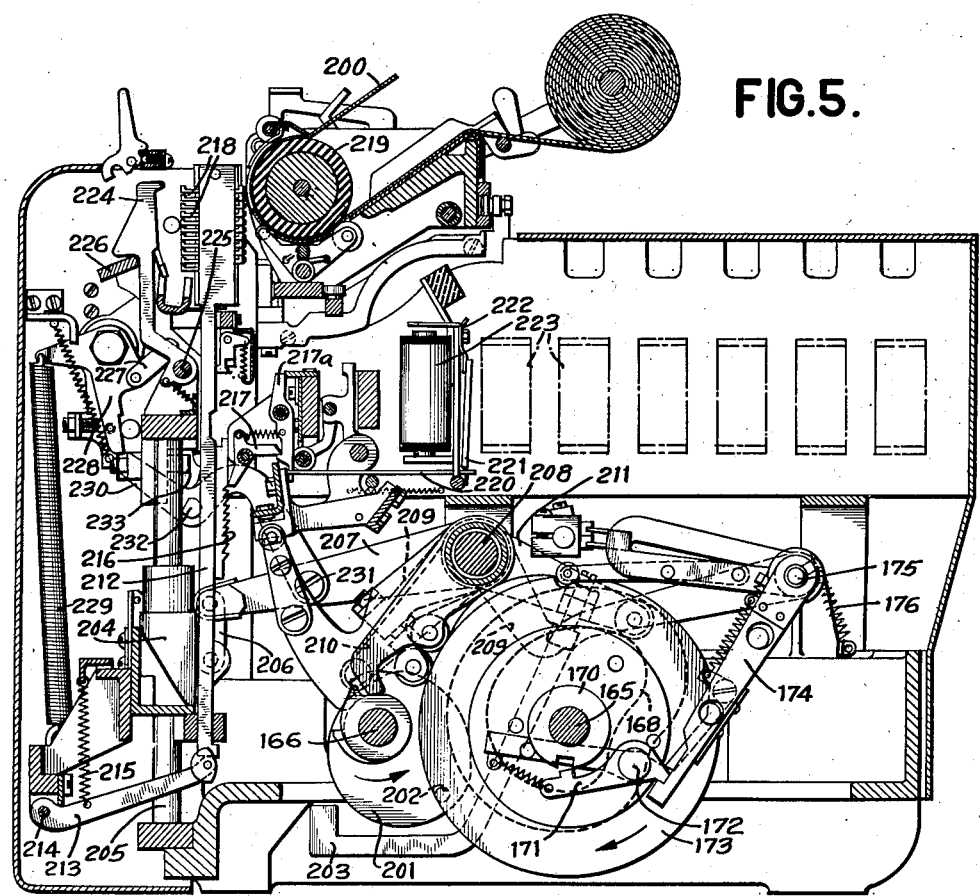
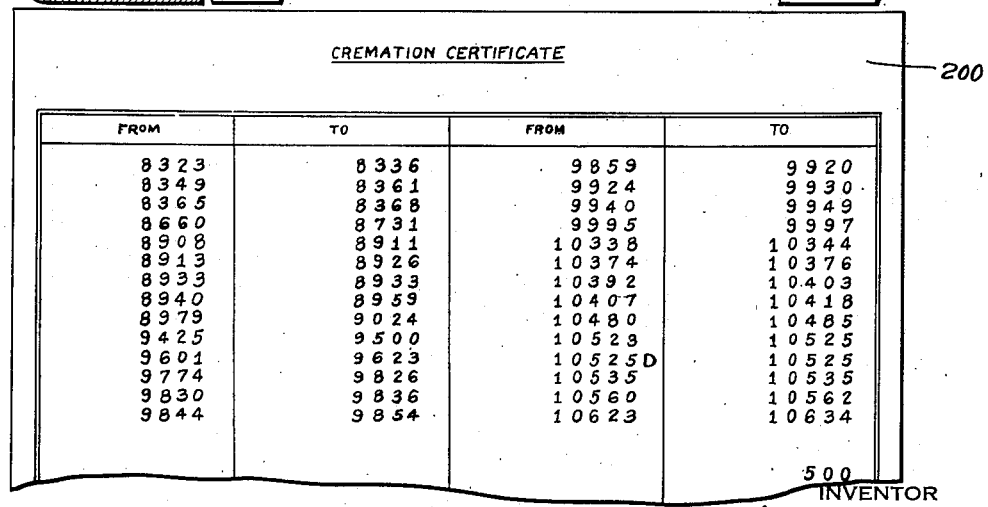
FIG.6.
INVENTOR
William W. McDowell
BY
ATTORNEY Dec. 10, 1940.   W. W. McDOWELL   2,224,769
TABULATING MACHINE
Filed Dec. 12, 1935   7 Sheets-Sheet 7

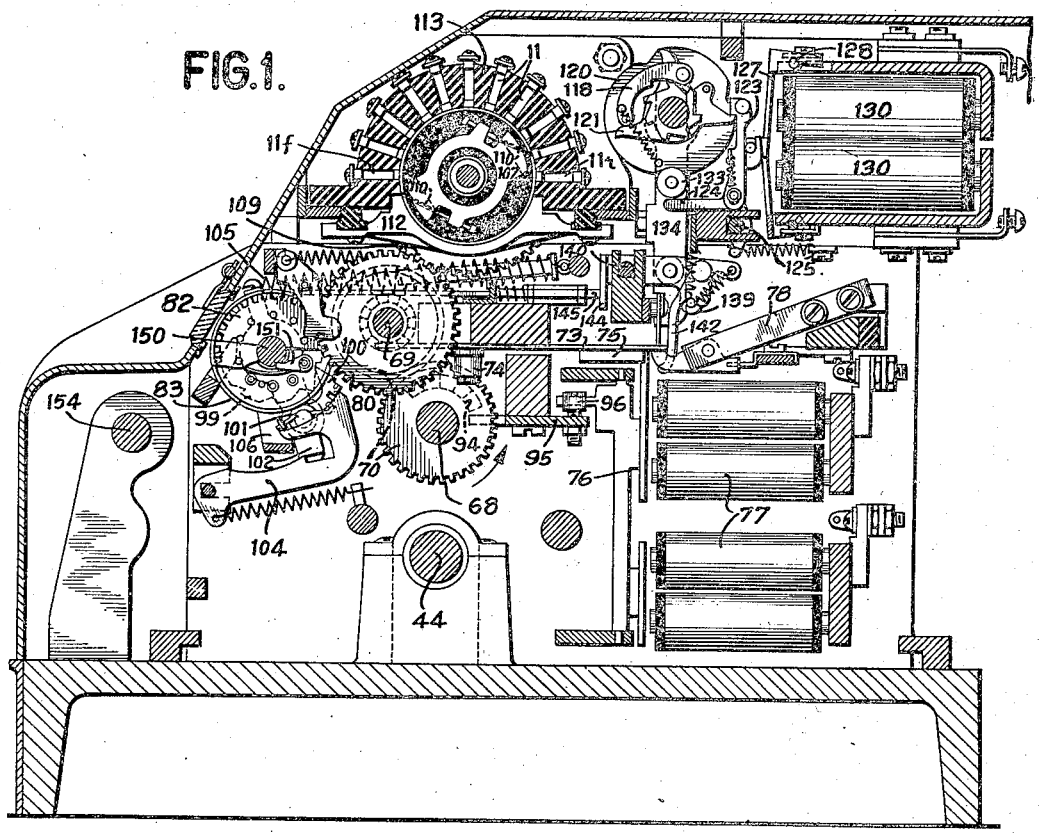
Dec. 10, 1940. W. W. McDOWELL 2,224,769
TABULATING MACHINE
Filed Dec. 12, 1935 7 Sheets-Sheet 1

Patented Dec. 10, 1940

2,224,769

UNITED STATES PATENT OFFICE 2,224,769

TABULATING MACHINE

William W. McDowell, Binghamton, N. Y., assignor to International Business Machines Corporation, New York, N. Y., a corporation of New York Application December 12, 1935, Serial No. 54,009

13 Claims. (Cl. 235—61.7)

This invention relates to improvements in accounting machines and more particularly the record controlled tabulator type of machine.

In many businesses, papers are destroyed by cremation or otherwise after they have served the purpose for which they were made. However, before they are destroyed, it is always well to make a record identifying the papers about to be destroyed as distinguished from the papers allowed to remain in existence. The forms of bonds, coupons and other papers are numbered serially and may thus be identified. Perforated cards are made to contain the data on the papers, and then these cards are sensed at a rapid rate to control the printing of an identifying record by the automatic tabulator machine of the present invention. Much space is saved on the identifying record by printing only the first and last serial numbers of groups of sequentially numbered cards representing groups of papers to be destroyed.

A lot number is assigned to a selected number of serial number cards (500 in the present instance) and a cremation certificate is printed for each lot of cards.

Two different kinds of record cards are used to control the machine. The one kind of card is perforated to represent a single consecutive or serial number and a lot number. The second kind of card is perforated with "from" and "to" numbers representing a run of serial numbers relating to a plurality of bonds. In addition, this run card also carries a lot number, a number representing the count of bonds or number of serial numbers included in the interval between the "from" and "to" numbers, and a special perforation distinguishing it from consecutive number cards.

The cremation certificate printed by the tabulator, lists the first and last serial number of each group and prints a total count of the number of cards in the lot. If two cards carry the same number, the mistake is automatically detected and a "D" is printed next to the second coinciding number.

An object of the present invention is to provide an improved form of printing device for recording groups of serially numbered data.

Another object of the invention is to provide means for automatically printing a sign to indicate that a pair of cards bear the same numbers when the numbers should be consecutive or differ by more than unity. The group control devices have novel provisions for detecting coinciding serial numbers and controlling the printing of a special sign.

A further object of the invention is the provision of means for comparing serial numbers by subtraction. The number on a card is entered in an accumulator and a unit is added thereto. Then the number on the next card is subtracted from the first sum. If the cards are numbered serially or consecutively, the accumulator will be restored to zero, otherwise it will contain a number indicating a break in sequence. When a break is sensed, automatic total and group number printing cycles are initiated to print the last serial number of a run and the first serial number of the following run.

It is an object of the invention to provide an improved form of accumulator control whereby a unit is added in an accumulator for each serial number card and a larger number is added in the same accumulator from a run card representing a plurality of serial numbers; the larger number being equal to the number of serial numbers. Thus an adding device is automatically changed from an item counter to an accumulator and vice versa. The total count printed under control of this combined counter and accumulator, provides a check to insure that all cards relating to one lot of bonds are present during tabulation.

Another object of the invention is to furnish accumulator devices which are adapted to be controlled from two different fields of perforations on two diffrent forms of record cards. This accumulator is provided to print "to" numbers under control of serial number cards and run cards. The accumulator is used in two different ways to arrive at the "to" number. When separate serial number cards are controlling, the "from" number, which is the serial number on the first card of a sequence, is entered into the accumulator and a unit is added thereto for each of the other cards numbered in sequence. Thus the "to" number is added and may be printed by taking a total printing operation under control of the accumulator. When the single run card controls the accumulator, the "to" number is read directly from the "to" field on the run card and added in the accumulator and printed as a total.

The invention is illustrated by a set of drawings which form part of this specification.

In the drawings:

Fig. 1 is a sectional elevation view of an adding and subtracting accumulator.

Fig. 2 is a sectional view of the card feeding and sensing devices.

Fig. 3 is an elevation view of a unit entering device cooperating with transfer mechanism for operating the units order adding wheel in an accumulator.

Fig. 4 is a perspective view of one order of an accumulator.

Fig. 5 is a sectional elevation view of the printing mechanism.

Fig. 6 is an example of the type of cremation certificate printed in the machine.

Figure 9:
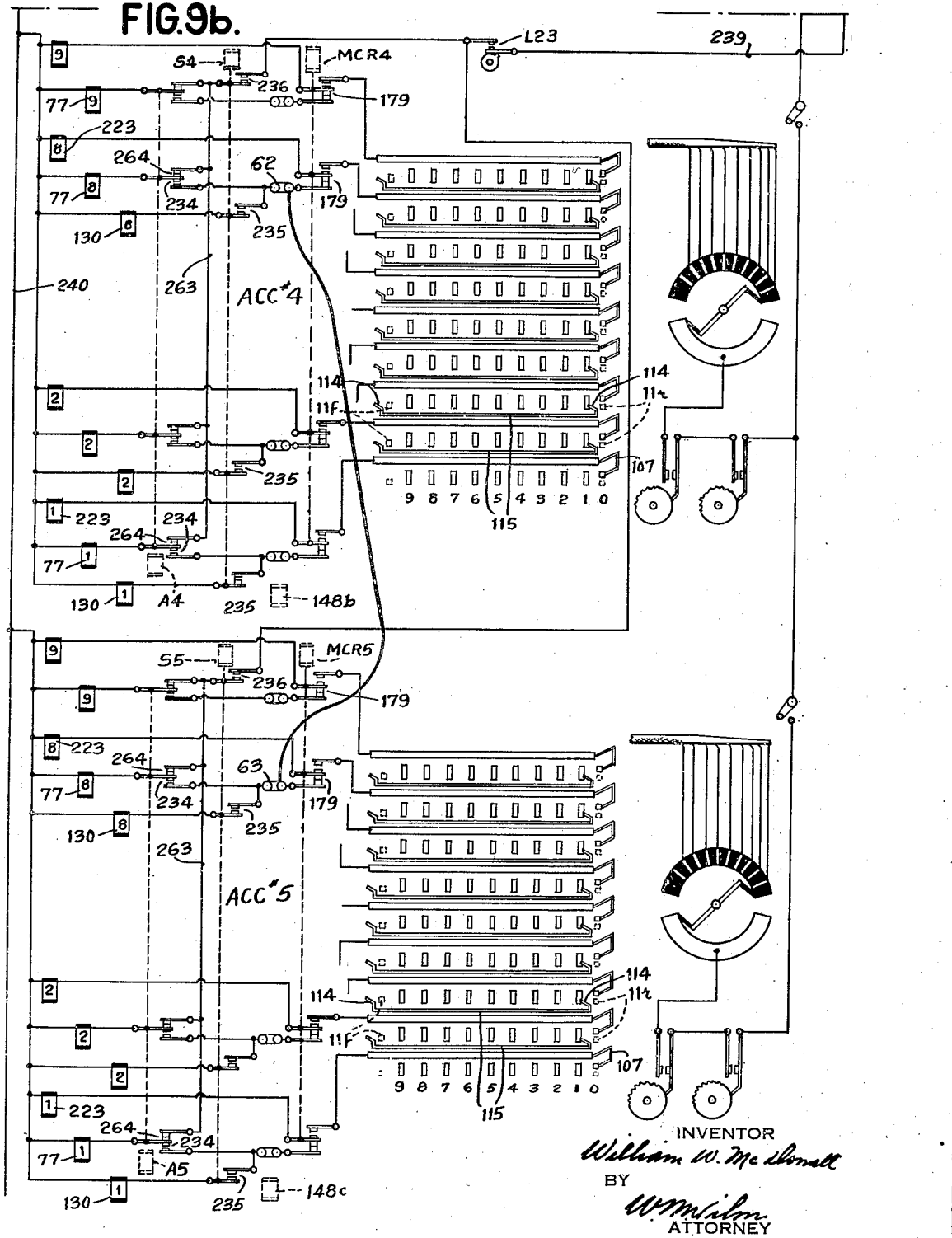

Figs. 9, 9a and 9b together form a wiring diagram of the machine.

Figure 10:
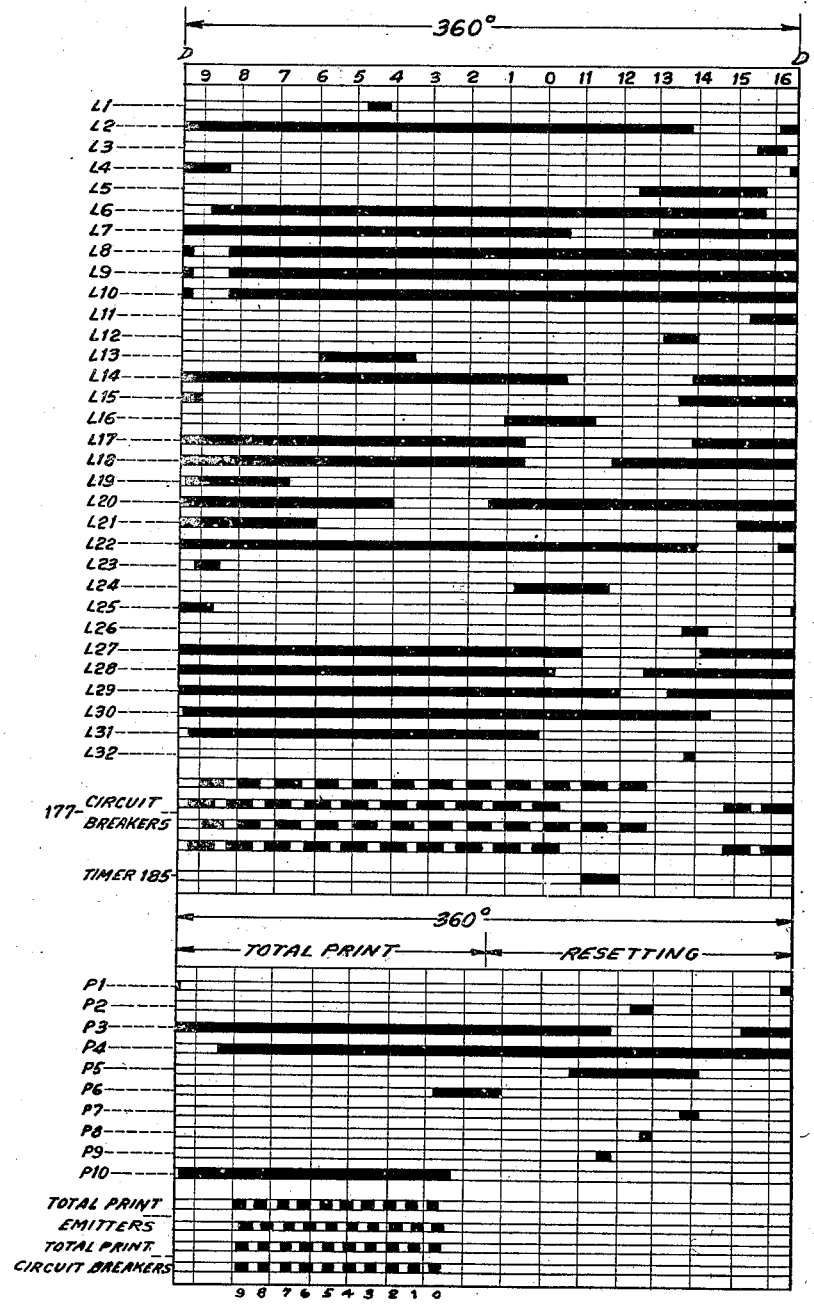

Fig. 10 is a timing chart of the special cam contacts controlling the machine.

The present improvements are incorporated in a machine generally the same as the one set forth in U. S. Patent 1,976,617, issued to C. D. Lake et al., on October 9, 1934. For a detailed description of the ordinary mechanism, reference may be made to the patent.

The record cards

Figure 7:
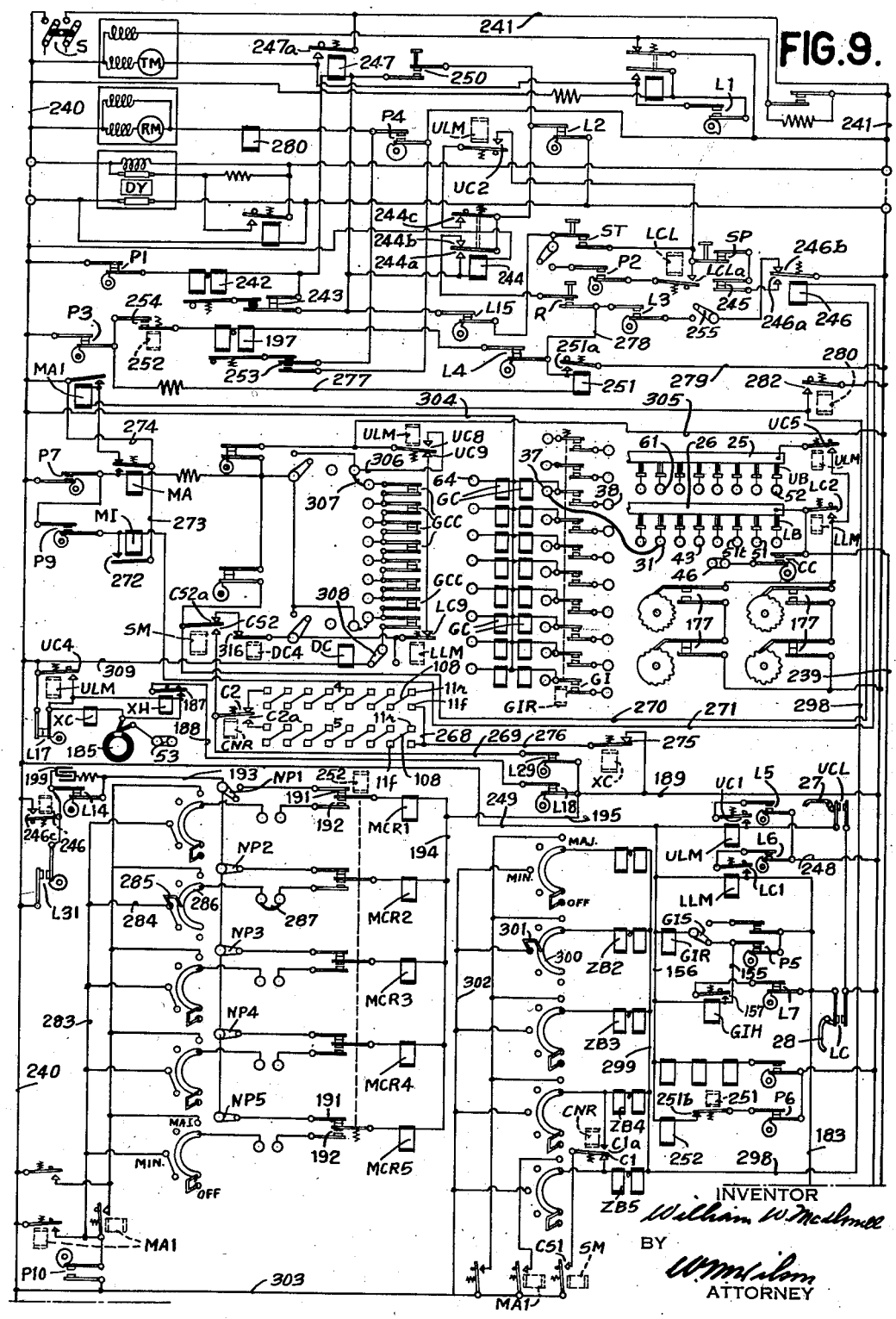
Fig. 7 is a portion of a record card bearing a consecutive number.
Figure 8:
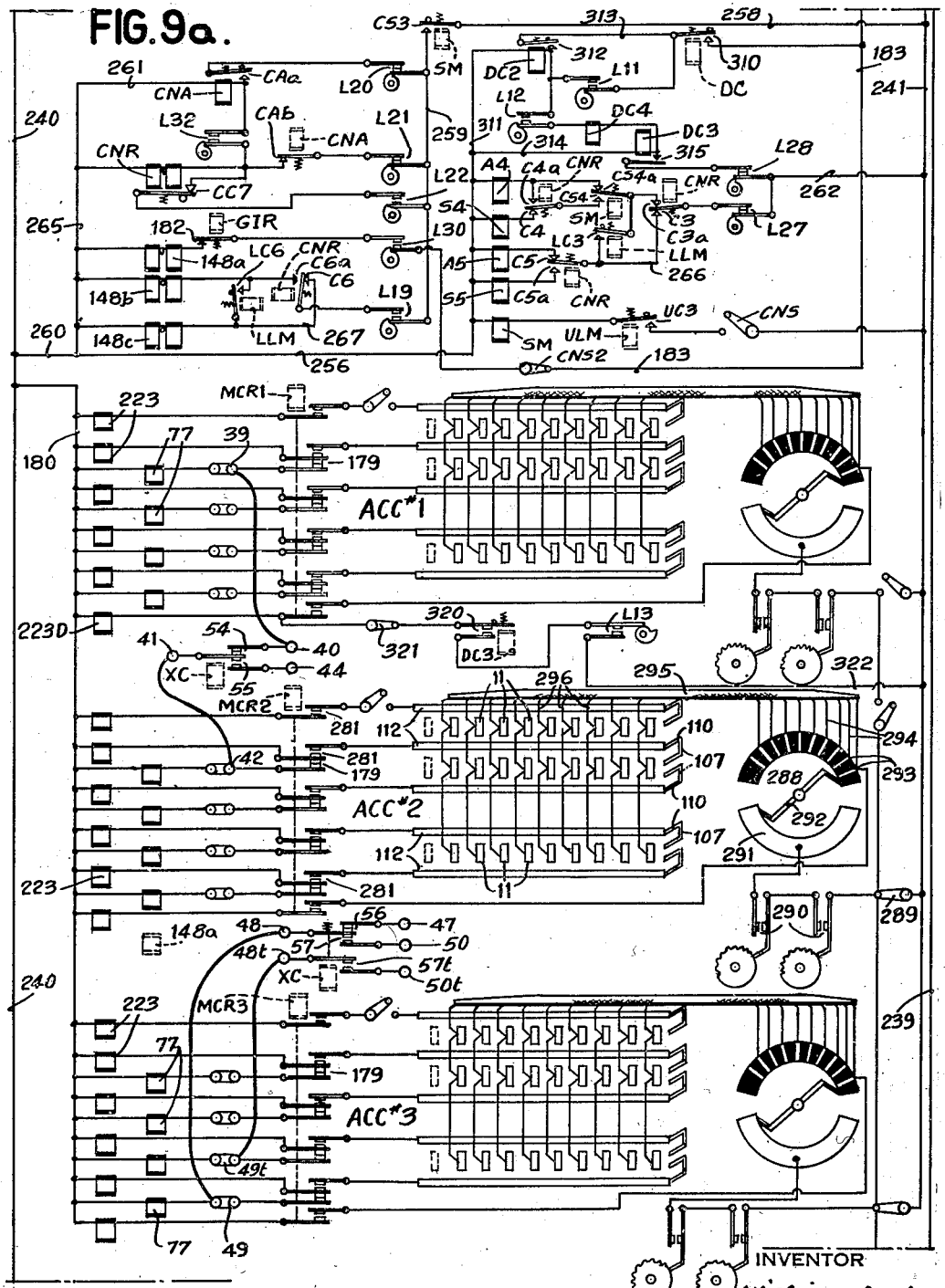
Fig. 8 is a portion of a "run" record card containing "from" and "to" numbers representing a sequence of serial numbers.

Two kinds of record cards are punched to control the tabulator. A serial number card 20, Fig. 7, is perforated to represent the number of a single bond and the number of the lot in which the bond is placed. In the illustration, 8323 is the bond number and 3 is the lot number. The other control card or run card 21, Fig. 8, is perforated to represent the first and last serial numbers of a group of bonds in consecutive order. This run card is also perforated to represent the lot number and the counted number of bonds in the group. It carries a special perforation or X hole 22 to distinguish it from the serial number cards 20. The perforations in the sample card of Fig. 8 show 3 as the lot number, 8349 as the "from" number, 8361 as the "to" number and 13 as the count of bonds.

The cards are sorted and arranged in numerical order before being placed in the tabulator.

Record sensing

A series of feed rollers 23 and 24, Fig. 2, move the record cards 20, 21 in the usual way, down between a line of upper sensing brushes UB and a contact roller 25; and then, one cycle later, down between a line of lower sensing brushes LB and a contact roller 26. When a card is under the upper brushes it operates a lever 27 to close upper card lever contacts UCL. In a similar way a card passing the lower brushes operates a lever 28 to close lower card lever contacts LCL. These contacts serve to control the electrical connections in the machine as explained more fully hereinafter with reference to the wiring diagram.

The sensing brushes and the connections therefrom to the accumulators and printers comprise the number entering or card analyzing means in the machine.

As the cards pass the brushes, the perforations therein allow contact between brush and roller and initiate impulses at differential times. The upper brushes UB are used to control the machine through class selection and automatic group control devices, while the lower brushes LB lead to the accumulation and print control magnets. In this case the upper brushes UB also control accumulation in the two subtracting accumulators.

The accumulators

The machine is provided with five accumulators which may be distinguished on the wiring diagram Figs. 9, 9a and 9b, by the numbers 1–5. The print magnets of accumulator 1 are used to print the "from" numbers. Accumulator 2 is used to count, add, item print and total print the "to" numbers. Accumulator 3 is operated to count and add the number of serial numbers in a lot and the total count is printed therefrom at the bottom of the cremation record. The other two subtracting accumulators 4 and 5 are operated alternately in addition and subtraction to compare successive numbers to determine if they are in consecutive order. As soon as a sequence of serial numbers is ended, either accumulator 4 or accumulator 5 initiates a total recording cycle to print the last serial number or the "to" number of the group under control of accumulator 2 before starting the recording of new run of cards.

Before considering the electric controls shown in the wiring diagram, it is believed well to explain briefly the mechanical construction of the various accumulating and printing units.

Adding devices

In Fig. 1 is shown a central section of one of the subtracting accumulators and the entering mechanism for additively entering items into this accumulator will now be described.

The same entering mechanism is provided in each of the other accumulators and the description of one of them will therefore suffice for the remainder.

The accumulator drive shaft 44 is in operation as long as cards are feeding. For each of the accumulators there are gear connections between shaft 44 and a shaft 68. The ratio is such that shaft 68 makes one complete revolution for each cycle of the machine; that is, for each card analyzed, shaft 68 makes one revolution. Shaft 68 drives a clutch shaft 69 through a pair of gears 70. Shaft 69 has slidably mounted thereon, but keyed for rotation therewith, a number of clutch elements 71, Fig. 4, there being one for each denominational order position of the accumulator. The member 71 is provided with a groove in which fits the end 72 of a lever 73 which is pivoted at 74. The lever 73 is provided with a block 75 normally held in position by an armature 76 of an accumulator magnet 77. A leaf spring 78 bears against the end of lever 73 and moves the same upon release of block 75 by armature 76.

This movement will bring clutching member 71 into engagement with co-operating teeth 79 integral with a gear 80 loosely mounted on shaft 69. Gear 80, when thus coupled to shaft 69, will rotate a gear 82 which meshes therewith and displace the accumulator index wheel 83. The rearward extremity of arm 73 is adapted to be engaged toward the end of each cycle by a finger 84 carried on a bar 85 for the purpose of disengaging clutch element 71 from teeth 79 and relatching block 75 on armature 76. The operation of bar 85 is controlled by a linkage operated by a cam on shaft 68. Near the end of each cycle, bar 85 is moved to the right, Fig. 4.

Briefly summarizing the adding operation, the magnet 77 may be energized at various points in the cycle of the machine, depending upon the location of a perforation in a column of a record card analyzed by the lower brushes LB. This energization may take place in response to a perforation in any of the index point positions from 9 to 1, inclusive. A perforation in the 9 position will trip the clutch element 71 nine steps before finger 84 is operated to de-clutch it, and a perforation in the 1 position will trip the clutch element 71 one step before it is de-clutched by finger 84. Each step of clutching engagement corresponds to a tenth of a revolution of the accumulator index wheel 83 so that a 9 hole will move it nine-tenths of a revolution and a 1 hole will move it one-tenth of a revolution. The manner in which circuits through the lower brushes LB control the operation of magnet 77 will be set forth in connection with the explanation of the circuit diagram.

The magnet armatures 76, Fig. 1, are also positively restored toward the end of the cycle by a face cam 94 carried by gear 70 which engages a sliding plate 95 to move the same longitudinally whereby eccentric studs 96 thereon will engage extensions on armatures 76 and rock the latter away from their magnets 77.

Carrying devices

Each wheel 83 (Fig. 1) has associated therewith a carry cam 99 which cooperates with a pawl 100 pivoted at 101 to an arm 102. When the wheel 83 passes through zero position, a high tooth of carry cam 99 will engage and rock its pawl 100, which through an extension thereon will rock a spring-pressed latch 104 downwardly. This latch normally serves to hold the member 102 of the next higher order in the position shown in Fig. 1.

Release of the member 102 will permit a spring 105, connected at its upper end, to rock the same in a clockwise direction and permit its pawl to engage the next adjacent tooth on the cam 99. This tripping action takes place during entering portions of the cycle at which time the carrying bail 106 is in a position shown in Fig. 3. After the entering portion of the cycle, the bail is rocked back to the position of Fig. 1, carrying with it all arms 102 which have been tripped by the carry cams of the next lower orders and will thus enter a transfer unit in the proper denominational orders.

Total read-out devices

Also driven by gear 80 (Figs. 1 and 4) is a gear 109 which is displaced in the same manner as index wheel 82. Since the ratio of gears 109 and 82 is two to one, the former will turn through half a revolution for each revolution of the latter. Carried by and insulated from gear 109 is a holder 107 with a pair of electrically connected brushes 110, one of which cooperates successively with ten conducting segments 111 in an insulation frame 113 while the other cooperates with an arcuate conducting strip 112. The relationship of the parts is such that when the index wheel 83 is in its zero position, one of the brushes 110 is in contact with the zero segment 110 (Fig. 4) and the other brush is in contact with the strip 112, thus forming an electrical connection between the two.

If the wheel 83 is displaced to indicate say 8, then one of the brushes 110 will be in contact with "8" segment 11 and the other brush will be in contact with the strip 112. The positioning of the brushes 110 provides a convenient electrical read-out mechanism for controlling total printing operations and the electrical circuits involved in these operations will be more fully explained in connection with the circuit diagram.

The operation of the accumulators thus far described is the same for all five accumulators, additive entries being made in all of them in the same manner and the total printing read-out commutators being differentially set in the same manner.

Subtracting devices

The description of subtraction mechanism about to be given pertains only to accumulators #4 and #5. Subtracting in the present machine is of the type known in the art as direct subtraction; that is, it is distinguishable from tabulators in which the amount to be entered is first converted into its complement by so-called translators and then this complement additively entered by the regular adding mechanism. In the operation of the present subtracting counter, the entry of the nines complement of a number to be subtracted is effected by initially tripping all the adding magnets 77 as though to add nine in each position and causing the perforation in the record card to de-clutch the adding mechanism in accordance with the location of the perforation. This will result in the addition of the nines complement of the number. The elusive one is added in the units order of the accumulator independently to thereby change the nines complement to a tens complement.

For example, if an 8 is to be subtracted in a particular order, the related adding magnet 77 is tripped at the 9 position in the cycle of the machine and the index wheel will commence to rotate. At the next index point position, which is 8, the perforation will, through the mechanism to be presently described, cause de-clutching of the mechanism after the index wheel 83 has turned through one step with the result that a one is added into the index wheel, thus representing the nine complement of 8. The mechanism for effecting this de-clutching action will now be described.

A subtraction operating shaft 116, (Fig. 4) has gear connections to the accumulator drive shaft 69, the ratio being such that shaft 116 makes two revolutions for one revolution of shaft 69. Secured to shaft 116 are a plurality of clutch elements 117, one for each denominational order position of the accumulator and cooperating with each element is a clutching dog 118 pivoted at 119 to a cam 120 freely mounted on shaft 116. Also freely mounted on the shaft is a triple-armed member 121, one of whose arms engages a pin 122 in the free end of dog 118 to hold the latter out of engagement with the driving element 117. Each of the arms of member 121 is adapted to cooperate in turn with a pawl 123 which is carried by clutch element 124 which is pivoted at 125. The pawl 123 is resiliently mounted on element 124 through spring and pin connection 126. A magnet armature 127 pivoted at 128 and having a pin 129 in a laterally extending arm thereof is adapted, upon energization of a subtracting magnet 130, to rock element 124 in a clockwise direction to release member 121 thereby permitting spring 131 to rock the element in a counterclockwise direction through pin 122 and at the same time permit the engagement of dog 118 with the driving element 117. The cam 120 will thus be driven in a counterclockwise direction until the next arm of member 121 is engaged by pawl 123, which then causes disengagement of the clutch and interruption of further movement of the cam. The cam 120 is provided with three notches 132 about its periphery, into which a roller 133 rises successively.

Upon the initial movement of cam 120, the higher, concentric portion of cam 120 will depress roller 133 and with it slider 134 upon which the roller is pivoted. A pin 135a extending axially from roller 133, engages a horizontal arm of element 124 to cause the positive restoration of clutching pawl 123 and armature 127 immediately after the clutching action. Slider 134 has adjustably connected thereto a slider 135 which is vertically adjustable with respect to slider 134, as by screw and slot connection 136. The lower end of slider 135 is provided with a notch into which the horizontal arm of a bell crank 137 is fitted. The bell crank is pivoted at 138 and its depending arm lies adjacent to an edge of the clutch arm 73 so that the downward movement of slider 135 will cause the bell crank 137 to engage and move arm 73 in a declutching direction at a time determined by the time of energization of magnet 130 which is controlled by a circuit extending through a lower card sensing brush LB.

It is desirable at the time of declutching the adding mechanism to also cause the positive restoration of the armature 76 of magnet 77 which ordinarily would not be positively restored until the end of the cycle. This is effected through an arm 139 pivoted at 140 and having connection with the slider 134 through a stud 141. Arm 139 carries a spring-pressed pivoted finger 142 whose downwardly extending portion is adapted to engage the armature 76 and move it away from its magnet 77. A spring 143 is provided to move arm 139 and incidentally slider 134 upwardly after they have been depressed.

Arm 139 is also provided with an offset finger 144 which engages a horizontally slidable rod 145 whose opposite end is connected through a pin to a finger 146 pivoted at 147. The free end of finger 146 lies in the path of spaced pins 97 on gear 82, and the finger will be moved into co-operation with one of the pins 97 at the time that declutching is effected as just described. This will prevent over-throwing of the index wheel 83 which might otherwise take place due to the high speed at which this mechanism is operated.

*Elusive unit and adding unit entry devices*

The mechanism by means of which an elusive unit or an extra adding unit is entered into an accumulator is illustrated in Fig. 3. Associated with the units orders of accumulators 2, 4 and 5 are transfer devices and a control magnet such as that shown in Fig. 3. An entry magnet 148a associated with accumulator #2 is energized on each card cycle of a group, except the first card cycle which is a "from" number entering cycle, in order to form a "to" number. The other two unit entry magnets 148b and 148c are associated with the subtracting accumulators 4 and 5 and are operated therein for two reasons; to make up a consecutive number for comparing control and to fill out the complement in subtraction, as explained more fully with reference to the wiring diagram.

As an example of a unit entry device, Fig. 3, the units order of accumulator 2 has associated therewith a magnet 148a whose armature 149 is secured to the carry lever latch 104 of the units order, so that energization of magnet 148a will trip the units pawl carrying arm 102, whereby during the carrying portion of the machine cycle, the pawl 100 associated with the units order will advance the units wheel one step.

*Accumulator resetting mechanism*

Resetting of each accumulator is effected in the following manner: The shaft 150 (Fig. 1) upon which the index wheels 83 of an accumulator are loosely mounted is notched for cooperation with spring-pressed pawl 151, pivoted upon and carried by the individual index wheels. The shaft 150 is adapted to be coupled with a reset shaft 154. There are, accordingly, five coupling devices, there being one for each of the five accumulators. The shafts 150 may be selectively coupled to the resetting shaft for resetting of one or more of the accumulators. In the resetting operation, shaft 150 is rotated one complete revolution during which the notch therein will pick up the pawls 151, which may be variously displaced, depending upon the setting of the index wheel, and will bring them all to zero position.

*Printing mechanism*

*Listing.*—The printing mechanism is shown in sectional elevation in Fig. 5. The listing shaft 165 drives this mechanism during listing operations, and the totaling shaft 166 drives it during total taking operations. Shaft 165 is geared to the drive shaft 44 and motor TM and is operated thereby only during card feeding cycles when listing control is selected. Secured to shaft 165 (Fig. 5) is a clutch driving element 170 with which a spring-pressed clutching dog 171 is adapted to cooperate. The dog is pivoted at 172 to the listing box cam 173 which rotates with the shaft 165 only when the dog 171 is in engagement with driving element 170. The dog is normally held in the position shown in Fig. 5 by a clutch operating arm 174 mounted upon a shaft 175 which is normally biased in a clockwise direction by a spring 176. When the machine is conditioned for listing operations, that is, when it is desired to operate the printing mechanism for each card fed through the card feeding mechanism, the clutch arm 174 is rocked out of engagement with the dog 171 and maintained in such disengaging position.

*Tabulating.*—The tabulating form of operation is carried on so that a plurality of cards are analyzed without printing operation and then a total of the group is printed, the accumulator is reset, and the group number of the following set of cards is printed on a single listing cycle which follows the total. This form of operation is used in the present invention to compare consecutive bond numbers on cards until there is a break in the numbers. Then a total corresponding to the last bond number of a succession (a "to" number) is printed, the accumulator is reset, and a single listing cycle follows during which the first bond number on the first number card of new group (i. e. a "from" number) is printed.

The tabulating or total shaft 166, Fig. 5, is adapted to be clutched to a reset drive motor RM under control of a magnet 197, Fig. 9, as described more fully hereinafter with reference to the wiring diagram. This motor RM operates for total taking and reset operations only. Shaft 166, Fig. 5, carries a cam 201 which operates the printing mechanism during total taking operations.

During tabulating operation the listing clutch arm 174 is in engagement with dog 171 at all times except on the first cycle following a total taking operation. The machine is so arranged that shafts 165 and 166 are incapable of concurrent operation and mechanism is provided for causing a single revolution of cam 173 to follow each revolution of shaft 166. A pin 202 carried by cam 201 is adapted to engage the free end of an arm 203 which is secured to shaft 175 to rock the shaft in a counterclockwise direction and release clutching dog 171 for engagement with driving element 170. This action is effective to permit so-called first card or group number indication; that is, permit listing data directly from the first card of each group which is being tabulated, when the machine is set for tabulating operations. Under such conditions the clutching dog 171 is normally held out of engagement with its driving element. Since the rocking of arm 203 by pin 202 is momentary, the shaft 175 will return to its latching position and cam 173 will come to rest after a single revolution, which is concurrent with the analysis by the lower brushes of the first card of a new group passing through the card feeding and analyzing section.

A printing cross head 204 is mounted for vertical reciprocation on guide rods 205 and is connected by links 206 to arms 207 secured to a shaft 208. This shaft has secured thereto a double-armed member 209, one arm of which cooperates with a follower arm 210 actuated by total cam 201 and the other arm cooperates with a cam follower 211 operated by a cam groove 168 in the listing cam 173. Because of this construction, it is apparent that shaft 208 may be rocked and the cross head lifted under control of either of the two cams.

*Type bar operation.*—Slidably mounted in cross-head 204 are a series of type bars 212 suitably guided for vertical reciprocation. Their lower ends abut the free ends of arms 213 pivoted at 214 to the cross-head 204 and held in the position shown in Fig. 5 by springs 215. Thus, upward movement of cross-head 204 will be accompanied by movement of type bars 212 in the same direction under the influence of springs 215. The type bars are provided with a plurality of ratchet teeth 216, which cooperate with stopping pawls 217 so that the type bars may be interrupted at various positions to present any of their type elements 218 in line with the printing platen 219 for cooperation therewith.

By virtue of the spring connection 215, the bars 212 may be stopped without interfering with the upward movement of the cross-head which has an invariable extent of reciprocation controlled by the cams 201 and 173. The stopping pawl 217 is normally held in inoperative position by a spring-pressed pivoted latch 217a, whose lower end is connected by a rod 220 to a bell-crank member 221 which is pivoted at 222 and one arm of which constitutes the armature of a printing control magnet 223. Energization of magnet 223 will rock bell crank member 221 in a counterclockwise direction, drawing rod 220 toward the right to unlatch pawl 217 so that it may swing into engagement with teeth 216 and interrupt the upward movement of the type bar 212. The energization of magnet 223 is controlled by the lower brushes LB, which, upon sensing a perforation in the record card 20 or 21, will complete the circuit to the magnet 223 and, due to the synchronization of the type bar travel with the passage of the card by the brushes, will present in printing position that type element 218 corresponding to the controlling perforation.

Associated with each type bar 212 is a spring-pressed printing hammer 224 pivoted at 225. The hammer normally rests against an operating bail 226 also pivoted at 225. The bail is connected by a link 227 to a tripping member 228 biased in a counterclockwise direction by a spring 229. The extremity of one arm of member 228 is in latching cooperation with an arm 230 pivoted at 231 to the cross-head operating lever 207. As the arm 207 is rocked in a clockwise direction to elevate the cross-head and type bars 212, the pivot 231 is moved upward therewith, causing member 228 to be rocked in a clockwise direction against the tension of spring 229 and rocking bail 226 in a counterclockwise direction through the link 227. As the lever 207 reaches near the upper end of its stroke, a pin 232, carried by arm 230, will engage a fixed stud 233, which will then act as a pivot for the arm 230 so that further upward movement of connection 231 will cause counterclockwise rocking of arm 230 with stud 233 as a pivot, causing the arm to release member 228. The spring 229 will thereupon rock the member 228 rapidly in a counterclockwise direction, forcing bail 226 against the hammers 224 so that the latter will strike the type elements 218 which are in printing position to effect impressions on record strip 200.

*The record*

In Fig. 6 is shown a sample cremation certificate record 200 produced by the printing control devices of the present invention. The "from" numbers are in the left columns and the related "to" numbers are directly to the right of them. The destroyed bonds may be identified by observing a "from" member on the left, such as number 8349, and then noting the "to" number 8361 directly in line therewith. This shows that the bonds numbered 8349 to 8361 inclusive, or 13 bonds numbered in consecutive order have been destroyed.

To determine the identification and number of bonds not destroyed, it is only required that a certain "to" number such as 8361 be noted and then tracing down one line diagonally to the left a number 8365 is found. This shows that bonds numbered 8362 to 8364 or 3 bonds numbered in consecutive order have not been destroyed.

The printed letter D in line with number 10525 shows that an error was made in punching record cards corresponding to the bond numbers. Two cards were punched for number 10525. This letter D is printed automatically by the special type carrier under control of the group control devices as explained hereinafter.

The number 500 printed at the bottom of the sheet is a record of the total number of destroyed bonds included in the lot recorded on the certificate. It is printed as a total under control of accumulator #3 which adds a unit for each bond number card and adds the count of bonds on run cards.

The printed numbers may be arranged in two long columns or, after a certain number of lines are printed, the tabulator may be stopped so that the operator may space the carriage. This is done to arrange the numbers in four lines in a more compact formation on the cremation certificate as shown in Fig. 6.

*Consecutive number comparing controls*

The subtracting accumulators 4 and 5 are provided with means for comparing successively entered numbers to determine if they are in consecutive order. As long as the numbers are consecutive the comparing means permits continued card analyzing operation of the tabulator without printing, however as soon as there is sensed a number not in order, a total taking operation is initiated to print a counted "to" number under control of accumulator 2.

The comparing devices include a rear spot 11r, Fig. 4 and a front spot 11f in each of the insulation frames 113. Cooperating with the spots are a pair of brushes 114 fixed in a holder 115 fastened to the side of gear 109 opposite to the side on which brush holder 107 is fixed. Thus each gear 109 in the subtracting accumulators 4 and 5 carries two read-out brush holders, the one for reading out totals and the other holder 115 for making comparing connections.

Brushes 114 are used solely for establishing contact between spots 11r and 11f. Although the brushes 114 touch the segments 11 they do not interfere with total reading circuits because the arcuate strip 112 is out of the path of brushes 114 and in position for only brushes 110 to cooperate therewith.

The brush holder 115 has a certain position with relation to holder 107 on gear 109. When a brush 110 is touching the "9" segment 11, then the related brushes 114 touch spots 11r and 11f. Thus, circuit connections are established in each order of an accumulator when the devices of that order register "9." This is done because comparing is accomplished by adding a number plus one on the first cycle of operation, and then on the next cycle the nines complement of the following number is added thereto and a comparison made before the elusive unit is added. If the numbers are consecutive there will be a "9" in each order of the accumulator and brushes 114 will connect spots 11r and 11f. The spots in the various orders of the accumulator are connected by cross wires 108, Fig. 9, running from a spot 11r in one order to the spot 11f in the next higher order. The bridging of all the openings between spots 11r and 11f in all the orders by brush holders 115 positioned at "9" serves to complete a consecutive comparing circuit which continues the operation of the machine as explained hereinafter with reference to the wiring diagram. Should any accumulator wheel stand at any position other than "9" at comparing time, then the brushes 114 are removed from the spots and the comparing circuit is broken, the card feeding operation is interrupted and a total is printed.

In the same complement entering cycle that the comparing connections of an accumulator are tested, and after such a test is made, the elusive unit is entered to fill out the complement. If the two numbers added and subtracted in the accumulator were consecutive, all the wheels are at "9" and the addition of the elusive unit turns them all to zero in readiness for another comparison. Should an accumulator register anything but all nines due to a break in consecutive numbering, then that accumulator is reset during the total taking cycle which follows a break in the comparing circuit.

The wiring diagram

The diagram in Figs. 9, 9a and 9b is of interest in connection with an explanation of the operation of the machine as a whole.

A switch S, Fig. 9, connects lines 240 and 241 to a source of current. Card feeding is initiated by depressing a start key to close contacts ST. The circuit through contacts ST includes line 240, contacts P1, tabulating clutch magnet 242, contacts 243, contacts L—15, start key contacts ST, stop key contacts SP, stacker contacts 245 closed as long as there are not too many cards in the feed stack, closed relay contacts 246a and line 241. A parallel circuit from line 240 to contacts L—15 energizes clutch relay 244. Energization of magnet 242 will cause an opening of contacts 243 and the circuit will include relay magnet 247. Magnet 247 closes its contacts 247a to complete a circuit through the tabulating motor TM as follows: from line 240, motor TM, contacts 247a to line 241, thus initiating operation of the motor and card feeding.

An emergency start button is provided to close contacts 250 and energize magnets 242 and 247 by a circuit extending through contacts L2.

As the cards pass through the two sensing stations they first operate lever 27 to close the upper card lever contacts UCL and then one cycle later they operate lever 28 to close the lower card lever contacts LC. Magnets ULM and LLM in line with contacts UCL and LC respectively are energized when the contacts close. The magnets establish holding circuits through wire 248, contacts L5 and L6, and wire 249 by closing contacts UC1 and LC1 in line therewith. These card lever magnets ULM and LLM control various circuits throughout the machine in a manner which is noted as this specification continues.

A reset operation may be initiated by manually closing contacts R. This completes a circuit from line 241, contacts L2, contacts 244b, contacts R, relay 251 and contacts P3 to line 240. Magnet 251 closes contacts 251a to set up a holding circuit which is extended through magnet 197 when contacts L4 close. Magnet 197 trips the reset clutch mechanism and closes contacts 253 to direct a circuit through the reset drive motor RM.

Neither a manual nor automatic reset operation can take place during tabulating operation because then the contacts 254, in line with magnet 197, are held open by a magnet 252 normally energized as long as the consecutive comparing control devices sense consecutive numbers. As explained hereinafter, when a pair of members fail to be consecutive, a magnet 246 is deenergized to close normally-open contacts 246b. These contacts are in line with an automatic reset switch 255 which is closed for comparing operation, contacts L3, magnet 251 and contacts P3. When contacts L3 close near the end of the last tabulating cycle, magnet 251 is energized. This magnet then opens contacts 251b and deenergizes magnet 252 which permits contacts 254 to close in readiness for a reset operation.

For a detailed account of the operating controls shown at the top of Fig. 9, reference may be made to Patent 1,976,617 mentioned hereinbefore.

Accumulator 1, Fig. 9a, is used to print the bond number on the first card of a consecutively numbered group. The number is sensed as the card passes under the lower brushes LB. The impulses from the lower brushes are directed through contacts G1 which are operated so that only the first number of a group is printed by accumulator 1. Contacts G1 are controlled by a magnet G1R which is energized on the first cycle following a reset cycle.

During any resetting cycle, cam contacts P5 close to complete a circuit from line 241 card lever contacts LC, contacts P5, wire 155, relay magnet GIH, wire 156 and wire 249 to line 240. The consequent closure of contacts 157 will establish a circuit from line 241, contacts LC, contacts L7, contacts 157, magnet GIH and wires 156, 249 to line 240. Coincident with the energization of magnet GIH, a parallel circuit extending from contacts P5, through a switch GIS, group indicating magnet GIR and wires 156 and 249 to line 240, will energize magnet GIR to cause closure of contacts GI. A holding circuit for magnet GIR will thereupon follow from line 241, contacts LC, contacts L7, contacts 157, wire 155, switch GIS, magnet GIR and wires 156, 249 to line 240. The contacts GI will therefore be closed upon initiation of the card feeding cycle which follows a resetting operation and will remain closed during the entering portion of the cycle and permit the completion of circuits from the lower brushes to the devices to be controlled. Later in this first card cycle, cam contacts L7 open to break the holding circuits and magnet GIR will be deenergized, permitting contacts GI to open so that further entries from the lower brush positions connected to the contacts GI will be suppressed.

A printing circuit may be traced from the lower brushes LB, through the GI contacts and into accumulator 1 and the print magnets 223 associated therewith. There is a corresponding circuit for each denomination of bond number perforations. The circuit runs from line 241, Fig. 9, through breaker contacts 177, contacts LC2, contact roller 26, lower brush LB, socket 31, wire to socket 37, contacts GI, socket 38, wire to socket 39, Fig. 9a, then through the adding magnet 77 and around through contacts 179 to the printer magnet 223 and wire 180 to line 240. Thus a "from" number is printed such as those shown in Fig. 6.

At the same time that a "from" number is printed, it is added in accumulator 2 so that a unit may be added thereto for each additional operation in order to form a "to" number. The connections from the lower brushes sensing the "from" number continue from socket 39, Fig. 9a, through a wire to a socket 40, and normally closed contacts 54, socket 41, a wire to socket 42 in accumulator 2, adding magnet 77 and wire 180 to line 240. Since these adding connections are under the influence of the GI contacts, only the first number of a series of consecutive numbers is added in accumulator 2. After the first cycle of operation, additional units are added under control of a magnet 148a mentioned hereinbefore. This magnet 148a is ineffective during the first cycle. It is made ineffective by the operation of magnet GIR, Fig. 9a, in opening contacts 182 in line therewith. After the first cycle of each group, contacts 182 are permitted to close and an impulse is directed through magnet 148a on each operation by a contact L30. This circuit may be followed from line 240, through wire 260, Fig. 9a, wire 265, magnet 148a, contacts 182, contacts L30, wire 183, Fig. 9, and through contacts LC to line 241.

Thus a "from" number, plus a unit for each consecutive number card following thereafter, may be added in accumulator 2 to form a total which is a "to" number.

If a run card 21, Fig. 8, is encountered instead of a number card 20, Fig. 7, the connections to accumulator 2 must be changed. Then it is unnecessary to add the "from" number and build up a "to" number, because the "to" number is present on the run card and may be sensed directly therefrom. The change in connections is controlled by an $x$ hole 22, Fig. 8, on the run card which is sensed as the card passes the upper brushes UB.

An $x$ hole control magnet XC, Fig. 9, is connected to control when a run card is sensed. The circuit for magnet XC may be traced from line 241 through breaker contact 177, lever contacts UC5, contact roller 25, the upper brush UB sensing the $x$ hole column, socket 52, a wire to socket 53, impulse timer 185 for closing a circuit only at the $x$ time, magnet XH, contacts UC4 and line 240. Magnet XC is energized in parallel with magnet XH over connections through timer 185, magnet coil XC, contact points UC4 and wire to line 240. Magnet XH sets up a holding circuit for magnet XC by closing contacts 187. The circuit includes contacts UC4, magnets XH and XC, contacts 187, wire 188, contacts L18 and wire 189 to line 241.

When the last card passes from the upper brushes UB and allows contacts UC4 to open, a shunt is established around contacts UC4 by the closing of contacts L17 which remain closed until the last card is analyzed under the lower brushes LB.

Over these connections, magnet XC is held energized as the run card is sensed under the lower brushes. Near the end of the card reading cycle, contacts L—18 open momentarily to deenergize magnets XC and XH. If the following card is a number card 20, magnets XH and XC remain deenergized, but if another run card 21 is presented, the upper brush senses the $x$ hole and again activates magnets XH and XC.

The energized magnet XC, Fig. 9a, serves to change the adding connections to the accumulator 2 by opening contacts 54 and closing contacts 55. These closed contacts lead to the lower brushes LB sensing the field of the run card 21 containing the "to" number, such as the number 8361 on the card in Fig. 8. An example of the run card "to" sensing circuits may be traced on Figs. 9 and 9a by following from the lower brush LB connected with a socket 43, Fig. 9, through a wire to socket 44, Fig. 9a, closed contacts 55, socket 41, a wire to socket 42 and through the adding magnet 77 to the line.

As this "to" number is added in accumulator 2 from the run card, the "from" number in the same card is printed as sensed by brushes LB just as the numbers on the ordinary cards are printed as explained hereinbefore. This is possible because the numbers on cards 20 are in the same field as the "from" numbers on run cards 21, and the opening of contacts 54 does not halt entries into accumulator and print bank #1.

Thus the "to" number is accumulated in accumulator 2 in two ways, directly from a run card or built-up by adding a "from" number plus a unit for each cycle. At the end of either type of operation the "to" number is registered as a total in the accumulator. In order that it may be printed on the record sheet 200, a total printing and reset cycle is initiated every time a run card is sensed and every time there is a break in the consecutive numbers. The automatic total and reset cycles are initiated by the magnet XC and by the consecutive number comparing devices in accumulators 4 and 5 in a manner set forth hereinafter.

Accumulator 3 operates to count and add the number of bond numbers considered during the sensing of a lot of cards. It is governed in two ways; to add a unit for each number card 20 and to add the count of bonds, such as the number 13, Fig. 8, on each run card 21. It is controlled by magnet XC to distinguish between number cards and run cards in somewhat the same manner that accumulator 2 is controlled.

When ordinary number cards are sensed, the units order of accumulator 3 is connected to a card counter contact CC, Fig. 9, through x controlled contacts 56, Fig. 9a. Contacts CC close at the "1" time in each card cycle in a manner suited to add a unit in the accumulator connected thereto. The circuit connections for counting bond numbers in accumulator 3 may be traced beginning at line 241, Fig. 9, breaker contacts 177, contacts LC2, contacts CC, socket 46, a wire to socket 47, Fig. 9a, contacts 56, socket 48, a wire to units order socket 49 and through adding magnet 77 and wire 180 to line 240.

When a run card 21 is sensed under the upper brushes, magnet XC is energized and acts to break contacts 56 and close contacts 57 connecting accumulator 3 to the lower brushes sensing the field containing the total count of bond numbers on a run card. The adding circuit includes the lower brush LB connected to socket 51, Fig. 9, a wire to socket 50, Fig. 9a, contacts 57, socket 48, a wire to socket 49, units order adding magnet 77 and wire 180 to the line. Thus the amount in the units order of the count of bonds field on a run card is added in accumulator 3. Should the amount be larger than a digit, the tens order digit is added by wiring from the tens lower brush LB with a socket 51t, Fig. 9, and a wire to socket 50t in line with contacts 57t, socket 48t, and a wire to socket 49t in the tens order of accumulator 3.

The number added in accumulator 3 is retained therein until an entire lot of cards has been considered. Then, when the machine stops due to the opening of the contacts UC2 at the upper brushes, a total printing and resetting operation may be initiated by coupling accumulator 3 to the reset shaft and depressing the reset key. The record sheet 200, Fig. 6, may be positioned so that the total print such as the number 500 thereon, may be placed under the last "to" number. Automatic total recording from accumulator 3 may be had by setting the machine for major group control controlled by lot numbers.

It is desired that the amounts entered in accumulators 2, 3, 4 and 5 be withheld from printing during the entering operations. For this purpose, switches NP2, NP3, NP4, and NP5, in line with the print control relays MCR2, MCR3, MCR4 and MCR5, are closed. The print control relays operate to open the contacts 179 leading to the print magnets 223 in the four accumulators. The circuit through the print relays runs from line 240 through normally closed contacts 246c, contact L14, wire 193, closed switches NP, normally closed contacts 191, the print control relays, wires 194 and 195 to wire 189 and line 241. Cam contacts L14 are closed during the entering portion of each cycle. Contacts L31 are also closed during entering, to act as a shunt around contacts 246c until after the "0" point is reached. Condenser 199 prevents sparking at the contacts when contacts L14 open. Contacts 246c are held closed by the energized comparing control magnet 246 as long as consecutive numbers are sensed.

Switch NP1 is opened to deenergize print control magnet MCR1 so that the contacts 179, Fig. 9a, of accumulator 1 remain closed permitting printing of the "from" numbers.

In Fig. 9b there is shown the two subtracting accumulators 4 and 5 which are used for comparing successive numbers to determine if they are consecutive. These accumulators are alike in construction so that a description of one applies to the other. Before explaining how they are operated alternately in addition and subtraction it may be well to point out the general construction and mode of operation of these two subtracting accumulators.

When a number is to be additively entered into accumulator 4, a magnet A4 is energized in advance of the analysis of the record perforations representing the number to be entered. This will close contacts 234 during analysis so that circuits to the plug sockets 62 and 63 connected by wires to the sockets 61, Fig. 9, of the upper brushes UB will extend through contacts 234 to the adding magnets 77.

If a number is to be subtractively entered, magnet S4 is energized in advance of the analysis of the number, closing its contacts 235 and a single contact 236. The latter contact is connected to cam contacts L23 and circuit breaker contacts 177 timed so that at the "9" position in the cycle in the machine, a circuit is completed from line 241 (Fig. 9), breaker contacts 177, lower card lever contacts LC2, wire 239 (Fig. 9a), contacts L23, contacts 236, wire 263 and through all of the contacts 264 to all of the adding magnets 77 in accumulator 4. This trips all the adding wheel clutches of the accumulator at the "9" position and their index wheels commence to rotate.

As the perforations in the card are subsequently sensed by the upper brushes, the circuits therethrough to the plug sockets 62 will continue through contacts 235, subtracting magnets 130, to line 240, causing positive declutching of the adding wheels with the result that the number entered into the accumulator is the nine complement of the number analyzed by the brushes.

The carry magnet 148b in the units position is energized during the subtraction cycle. Magnet 148b actuates the carry mechanism of the units order so that in this position the number is complemented to ten. This magnet also operates on adding cycles in the present machine, in order that consecutive numbers may be set up and compared in the subtracting accumulator.

Since both subtracting accumulators 4 and 5 are connected together to the upper brushes UB, Fig. 9, through wires between sockets 61 and 62, Fig. 9b, and wires between sockets 62 and 63; the alternate adding and subtracting operation may be produced by energizing A4 with S5 and A5 with S4. This is done by comparing devices which are about to be described.

When it is desired that the machine operate with consecutive number comparing control, a switch CNS, Fig. 9a, is closed to select alternate adding and subtracting operation in accumulators 4 and 5. As soon as a card passes under the upper brushes, magnet ULM is energized and it closes contacts UC3 in line with switch CNS, a switch magnet SM and wire 256. Thus, magnet SM is energized and serves to operate many CS contacts throughout the machine.

A contact CS3 closed by magnet SM conditions consecutive number alternating relays for operation. A relay CNR is then energized by a circuit from line 241, Fig. 9a, through wire 258, contacts CS3, wire 259, contacts L21 normally closed, contacts CAb closed when a magnet CNA is deenergized, relay CNR and wires 265 and 260 to line 240. Relay CNR then closes contacts CC7 in readiness for a holding circuit through contacts L22, because contacts L21 are opened early in each cycle, but contacts L22 close before L21 opens and L22 remain closed until near the end of a cycle.

Near the end of each cycle, while contacts L22 are still closed, a pair of contacts L32 close momentarily to energize the auxiliary consecutive number relay magnet CNA. The closing of contacts L32 is effective only on those cycles in which contacts CC7 are closed. Then a circuit is formed from line 241, wire 258, contacts CS3, wire 259, contacts L22, contacts CC7, contacts L32, magnet CNA, wires 261, 265 and 260 to line 240. As soon as magnet CNA is energized it sets up a holding circuit through associated contacts CAa and contacts L20 held closed until near the middle of the next cycle.

When auxiliary magnet CNA is energized it also acts to open contacts CAb in line with magnet CNR so that at the end of the cycle, even though contacts L21 close while contacts L22 open, relay CNR will be deenergized. During the next cycle, contacts L20 open to deenergize magnet CNA and close contacts CAb, but relay CNR will not be energized until near the end of this cycle when contacts L21 again close. Then the aforementioned manner of operation is repeated when contacts L32 close to energize magnet CNA so that it may deenergize relay CNR for one cycle.

From the foregoing description it is apparent that relay CNR is energized on alternate cycles of operation of the machine. The alternating operation of relay CNR is used to control connections for changing from addition to subtraction in the two comparing accumulators 4 and 5.

Referring to the top of Fig. 9a, it is noted that the adding and subtracting control magnets A4, A5, S4 and S5 are in line with contacts controlled by magnets SM and CNR. With both of these control magnets deenergized, both adding magnets A4 and A5 are adapted to be energized to condition the accumulators for use as adding accumulators. However, with the special controls selected, magnet SM closes contacts CS4 and magnet CNR closes contacts C4a, C5a and C3a for the first cycle of operation.

On this first cycle of operation the closure of contacts C5a is ineffective to cause subtraction in accumulator 5 because contacts LC3 are not closed until the first card passes the lower brushes. This control is desired because there is no need to cause a subtracting operation with the passage of the first card under the upper brushes for at that time there is no number in accumulator 5 to be compared with the number on the first card. However, the number on the first card is added in accumulator 4 so that the number on the second card may be subtracted therefrom for comparison. The adding control circuit is as follows: line 241, wire 262, contacts L27 closed during perforation analysis, contacts C3a, contacts CS4, contacts C4a, magnet A4 and wires 256 and 260 to line 240. At the same time that magnet A4 is energized, contacts C6a are closed by magnet CNR to add a unit in accumulator 4 in addition to the number sensed on the first card. At this time contacts LC6 are open to prevent operation of the other unit entry magnet 148c associated with accumulator 5. The circuit through unit entry magnet 148b includes line 241, wire 258, contacts CS3, wire 259, contacts L19, contacts C6a, magnet 148b, and wires 265 and 260 to line 240.

In the second entry cycle, magnet CNR is deenergized and the first card passes the lower brushes, energizing magnet LLM and closing contacts LC3 and LC6. The alternating contacts are shifted so that magnets S4 and A5 are energized to enter the number on the second card subtractively in accumulator 4 and additively in accumulator 5. The circuit through magnet S4 includes contacts C3, wire 266, contacts LC3, CS4 and C4. The circuit through magnet A5 includes contacts C3, wire 266 and contacts C5. Thus, the number on the second card is subtracted from the first number plus one in accumulator 4, and added in accumulator 5.

In this same second entry cycle, both unit entry magnets 148b and 148c are energized, the one to fill out the complement entered in accumulator 4 and the other to form a consecutive number for comparison in accumulator 5. The circuit through magnet 148b includes contacts C6, wire 267 and contacts LC6. Magnet 148c is energized directly through contacts C6 and wire 267.

The third entry cycle is somewhat similar to the first, the only difference being due to the fact that contacts LC3 and LC6 are closed, magnets S5 and 148c are energized along with magnets A4 and 148b. The circuit through magnet S5 includes contacts C3a, LC3 and C5a. The circuit through magnet 148c passes across contacts C6a and LC6.

This alternating entry form of operation continues as long as the numbers on the cards are consecutive and as long as no run card is sensed. When the added and subtracted numbers fail to compare in an accumulator, that accumulator is reset and a total print and reset cycle is initiated to print the "to" number in accumulator 2. When a run card is sensed, a reset and total print cycle is initiated in accumulator 2 and the subtracting accumulator which received the "from" number on the run card as a subtractive amount is reset.

Comparing is carried on in the subtracting accumulators by means of the spots 11r and 11f (Figs. 9 and 9b) and brushes 114, described hereinbefore with reference to Fig. 4. In Fig. 9 it is noted that these spots are connected by wires 108 between all orders across both accumulators. It is also noted that the end spots 11f are connected to a common line by wire 268, and that the set of spots in either accumulator may be selected by closing contacts C2 or C2a. Magnet CNR controlling these contacts is energized alternately so that the spots selected are the ones in the accumulator in which subtraction is taking place, because that is the accumulator which is ready to compare successive numbers.

The brush holders 115 and brushes 114 (Figs. 4 and 9b) are adapted to close all the breaks between spots 11r and 11f (Fig. 9) across an entire accumulator when the numbers entered therein are consecutive. In line with the comparison wiring of accumulators 4 and 5 is the magnet 246 which exercises control the same as the usual minor group control magnet found in ordinary tabulators. This magnet must be maintained energized to keep the tabulator running. As soon as it is deenergized, card feeding is stopped and a total print and reset cycle is initiated. At a certain point in each cycle (after amount entry but before entry of an elusive unit) contacts L29, in a usually closed shunt around the comparison test wiring in accumulators 4 and 5, are opened to deenergize magnet 246 unless the comparison circuit is completed. The comparison circuit in accumulator 4 or 5 is complete at that time, only if all wheels stand at "9" with brushes 114 contacting spots 11r and 11f, as shown in Fig. 4. They assume such positions when the number corresponding to the nines complement entered is equal to the first number added plus one, denoting consecutive numbers. After contacts L29 open to test the positions of the comparing wheels and then close, one of the unit entry magnets 148b or 148c is effective to add a unit to the accumulator registering all nines, thus restoring that accumulator in readiness for the next additive number entry.

The normal circuit for comparing control magnet 246 may be traced from line 241 through wire 189, contacts L29, wire 269, contacts CS2 closed when consecutive control is selected, wire 270, magnet 246, wire 271, magnet MI, contacts 272 and wires 273, 274 to line 240.

When contacts L29 open a testing circuit is formed from line 241, wire 189, contacts 275 closed except when a run card is sensed, wire 276, wire 268 and then through either accumlator 4 or 5 according to which contacts C2 or C2a are closed by magnet CNR. This magnet operates alternately, as explained, to select the accumulator which received a complement and is therefore in condition for the consecutive comparison test. As shown, accumulator 4 is connected. The circuit continues from wire 268 through spot 11f, brushes 114 and holder 115, spot 11r, wire 108, spot 11f, etc., across the whole accumulator and through closed contacts C2, contacts CS2, wire 270, magnet 246, wire 271, magnet MI, contacts 272 and wires 273 and 274 to line 240.

As long as this comparing circuit is maintained it is a sign that the cards are perforated with consecutive numbers and the machine continues in operation to feed, sense and compare the cards. However, should a run card be sensed, or the test connections be opened by brushes 114 missing spots 11r and 11f, the circuit is opened and magnet 246 is deenergized. The sensing of the x hole 22 in a run card serves to energize the magnet XC which then opens contacts 275 in series with the test connections.

When magnet 246 is deenergized, denoting a break in consecutive numbering, the associated contacts 246a are opened to deenergize the motor TM and stop tabulating operation, and contacts 246b are closed to initiate a reset operation. Closed contacts 246b send an impulse through reset control magnet 251. The circuit includes line 240, contacts P3, wire 277, magnet 251, wire 278, contacts L3, switch 255, contacts 246b and line 241. The magnet closes contacts 251a to establish a holding circuit through wires 277 and 279.

Magnet 251 also opens contacts 251b to deenergize magnet 252 which allows contacts 254 to close energizing magnet 187 to close contacts 253 in series with the reset motor RM. Thus, the reset motor is called into operation and magnet 280 in line therewith is also energized.

The deenergized magnet 252 allows contacts 192 to close so that magnet MCR2 may be energized to close contacts 281, Fig. 9a, conditioning accumulator 2 for a total printing operation.

The energized magnet 280, Fig. 9, closes contacts 282 to energize zero button magnets ZB4 and ZB5, to couple the reset shafts of the accumulators to the reset drive shaft.

The total printing control circuit may be traced through contacts 192 and magnet MCR2 from line 240, contacts P10, wires 283, 284, brush holder 285, dial ring 286, plug wire 287, contacts 192, magnet MCR2, wires 194, 195 and 189 to line 241. Contacts P10 remain closed during the printing portion of the total taking cycle and magnet MCR2 accordingly keeps the contacts 281, Fig. 9a, closed throughout the same period.

Contacts 281 connect the printing magnets 223 to the common conducting strips 112 of the accumulator read-out device in accumulator 2. During the total taking cycle an emitter 288 directs timed impulses through the spots 11 to the printing magnets 223 according to the positions of the brushes 110 in holders 107. The total print circuits include line 241, switch 289, circuit breaking contacts 290, common bar 291, emitter brushes 292, segments 293, wires 294, cable 295, wires 296, spots 11, brushes 110 and holders 107 placed differentially, common strips 112, contacts 281, magnets 223 and wire 180 to line 240. The print magnets stop the type bars in position to print a "to" number after which accumulator 2 is reset. The total count amount in accumulator 3 is printed in the same manner, but only after all the numbers of a lot of cards have been recorded.

The zero button magnets ZB4 and ZB5, Fig. 9, associated with accumulators 4 and 5 are selected alternately by magnets CNR which opens contacts C1 and closes contacts C1a. The zero magnet selected is the one associated with the accumulator receiving the complement, so that if the number thus entered fails to be consecutive or if a run card is sensed, the proper subtracting accumulator is reset.

When magnet 280 closes contacts 282, a circuit is established from line 241 through contacts 282 and wire 298 up to wire 299 after which the circuit branches out in two directions. One branch includes magnet ZB2, dial sector 300, brush holder 301, wire 302 and wire 303 to line 240. The other branch follows through magnet ZB5, contacts C1, contacts CS1 and wire 303 to line 240. The energized magnets ZB2 and ZB5 act to couple the reset shafts 150 in accumulators 2 and 5 to the reset motor drive shaft so that these accumulators are restored to normal zero registering condition.

The devices for printing a "D" to denote the sensing of duplicate numbers on successive cards, are operated by group control devices including magnets GC. These magnets GC are wired in parallel, a pair for each control column on the card, and both cooperating with a common control contact GCC in the control circuit. One of an associated pair of magnets GC is wired to an upper brush UB, and the other is connected to the corresponding lower brush LB so that if coinciding perforations are found in successive cards, both magnets are energized at the same time and contacts GCC remain closed. When differing numbers are sensed on successive cards, only one of the pair of magnets is energized at a time and contacts GCC are opened. U. S. Patent 1,933,349 may be referred to for a more detailed account of this form of group control device.

The circuit through the magnets GC connected to the upper brushes is as follows: from line 241 through breaker contacts 177, contacts UC5, contact bar 25, upper brush UB, socket 61, a wire to socket 62, Fig. 9b, a wire to socket 63, from socket 63 a wire to socket 64, Fig. 9, through left magnet GC and wire 304 to line 240. The associated magnet GC is wired as follows: line 241, contacts 177, contacts LC2, bar 26, lower brush LB, socket 31, a wire to socket 37, right magnet GC, and wire 304 to line 240.

When duplicate cards are sensed, all contacts GCC are closed and a duplicate sign printing control magnet DC is energized. The circuit for energizing magnet DC may be traced from line 241, wire 305, contacts UC8 closed when a card is under the upper brushes, wire 306, a plug wire 307 to one side of the first contact GC, contacts GC in series, a duplicate control switch 308, magnet DC and wire 309 to line 240.

Magnet DC operates connections for printing a "D" on the group indicating or "from" number printing cycle which follows the reset cycle. Contacts 310 are closed by magnet DC and late in the cycle contacts L11 close to energize auxiliary magnet DC2 providing the contacts LC, Fig. 9 are closed by the lower brush lever 28. Then a duplicate sign print circuit is made up as follows: line 241, Fig. 9, contacts LC, wire 183, Fig. 9a, contacts 310, contacts L11, magnet DC2, wire 311, wires 256 and 260 to line 240.

Magnet DC2 closes contacts 312 to form a holding circuit therethrough and through wire 313 and contact 310 so that when contacts L12 are closed, magnets DC3 and DC4 are also energized. The circuit may be traced from line 240 through wires 260, 256, 311 and 314, magnets DC3 and DC4, contacts L12, contacts 312, wire 313, contacts 310, wire 183, Fig. 9, contacts LC and line 241. Magnet DC3 closes contacts 315 to form a holding circuit through contacts L28 which are held closed during the first part of the next list cycle. The circuit then includes line 240, wires 260, 256, 311 and 314, magnet DC3, contacts 315, contacts L28 and wire 262 to line 241.

Magnet DC4, when energized, opens contacts 316 so that if the machine is set for duplicate control without consecutive comparing control a reset cycle is induced by the group control devices including control magnet 246 in line with contacts 316. The deenergization of magnet 246 brings about a reset and total printing cycle when duplicate cards are sensed. However, when the machine is set for consecutive comparing control, contacts CS2a are opened so that the action of magnet DC4 is of no avail.

The other energized duplicate control magnet DC3, Fig. 9a, serves to close connections for stopping a type bar in position to print "D." This type bar is controlled by magnet 223D in accumulator 1 and is the same bar that carries the asterisk type and other special type. Contacts 320 controlled by magnet DC3 are in line with magnet 223D. At a certain time in the list cycle, a contact L13 is closed to energize magnet 223D and hold the special type bar in position to print "D." The circuit is as follows: line 240, wire 180, magnet 223D, switch 321, contacts 320, contacts L13 and wire 322 to line 241.

Of course, when the machine is set for consecutive number comparing control, as soon as duplicate numbers are sensed and detected by one of the two subtracting accumulators, a reset and total printing cycle is initiated. It is only after this cycle, on the first "from" number listing cycle, that the closing of contacts L13 are effective to print the special duplicate sign such as the one shown in the third column on record sheet 200, Fig. 6.

While there has been shown and described and pointed out the novel features of the invention in one form, it will be understood that various omissions, substitutions or changes in the form and details of the devices illustrated and in their operation may be made by those skilled in the art without departing from the spirit of the invention. It is the intention therefore to be limited only as indicated by the scope of the following claims.

What is claimed is as follows:

1. In a machine controlled by records perforated to represent groups of serial numbers arranged in numerical order, means for analyzing said records one at a time, a pair of accumulator devices, means under control of the analyzing means for operating said accumulator devices alternately to add one serial number and subtract the next serial number, means for adding a unit to the added serial number in the accumulator device operated in addition before the subtracting operation, means under control of said analyzing means for printing the first serial number of each group, means cooperating with said accumulator devices for sensing the amount representing condition of the accumulator devices to detect a break in sequence of the serial numbers denoting the end of a group of serial numbers, and means under control of said sensing means and said analyzing means for printing the last serial number of each group.

2. In a machine controlled by groups of cards presented in numerical order each containing indicia representing a single serial number and other run cards each containing indicia representative of "from" and "to" numbers representing a plurality of serial numbers, means for analyzing said cards, means connected with said analyzing means and controlled by single serial number cards for printing the first serial numbers of groups of serial number cards and controlled by the run cards to print the "from" numbers, an accumulator controlled by the run cards to add the "to" numbers, means under control of said analyzing means for operating said accumulator to add the first serial number of a group, means for operating said accumulator to add a unit for each serial number card of a group after the first card, means under control of said analyzing means for determining whether or not successively sensed numbers are in serial order, means for detecting the appearance of a run card, means under control of said detecting means for suspending operation of said determining means when a run card is detected, total taking means cooperating with said accumulator, means under control of said determining means and said detecting means for initiating a total taking operation of said accumulator when there is an interruption in sequence, and means under control of said accumulator for printing the "to" numbers and the last serial numbers of the groups.

3. In a machine controlled by groups of cards each perforated to represent a single serial number and other run cards each perforated with a special perforation and "from" and "to" representations of two numbers representing a plurality of intermediate serial numbers, said cards being arranged in numerical order, means for sensing the perforations representing the serial numbers on the groups of cards and "from" numbers on run cards, other means for sensing the perforations representing the "to" number on run cards, an accumulator, connections to said accumulator adapting it for control by the first mentioned sensing means to add the first serial number, means under control of the first-mentioned sensing means for printing the first single serial number of each group and "from" numbers, means for disconnecting said accumulator after the entry of the first single serial number card is completed, means for adding a unit in said accumulator for each single serial number card sensed after the first, printing means cooperating with said accumulator, means under control of said special perforation to operate said printing means to print a total of the sum in said accumulator to represent the last serial number of a group, other means under control of said special perforation for disconnecting said accumulator from the first sensing means and connecting the accumulator to said other sensing means, said printing means then being effective for printing a record of the "to" number perforations sensed in a run card.

4. In a machine controlled by record cards perforated to represent groups of serial numbers in numerical order with a card for each number, means for feeding the cards through the machine one at a time, means for sensing the perforations representing numbers on the cards, means under control of said sensing means for detecting when any of said sensed perforations representing serial numbers are not in serial order denoting a change in the serial card groups, means under control of said sensing means for printing the first serial number of each serial card group, means under control of said sensing means for adding the first serial number of each group and including means for forming the last serial number of each group, means under control of said adding means and said detecting means for printing the last serial number of each serial card group, devices under control of said sensing means for determining whether the number on each card is the same as the number on the next card, a sign printing device, and means under control of said determining devices for operating said sign printing device to print a "D" in line with the first number of a group when said first number is the same as the last number of the previous group.

5. In a machine controlled by records presented in numerical order each containing indicia representing a serial number, means for analyzing said indicia on the records, means for feeding said records in succession, a pair of accumulators, means under control of said analyzing means for operating said accumulators to enter therein groups of serial numbers, one number at a time in numerical order, means cooperating with said analyzing means for adding and subtracting the numbers in said accumulators, means associated with said accumulators for determining the additive or subtractive nature of the operation performed therein, an alternating means cooperating with said determining means for controlling addition in one accumulator while subtracting in the other accumulator in one cycle and then subtraction of the following number in said one accumulator while adding in said other accumulator on the next cycle, means under control of said alternating means for adding a unit in the accumulator operated in addition, devices associated with said accumulators for detecting whether an accumulator bears an amount determinative of a consecutive relation between numbers borne by successive records, means under control of said alternating means for making effective the detecting devices in the accumulator operated in subtraction, after the subtraction operation, and means under control of the effective detecting devices for indicating when successive records bear numbers that are not consecutive.

6. A machine according to claim 5 with a means cooperating with said determining and alternating means for suppressing the subtraction operation when the first number of a group is being entered.

7. In a machine controlled by records presented in numerical order each containing indicia representing a serial number, means for analyzing said indicia on the records, means for feeding said records in succession, an accumulator comprising a plurality of adding wheels, means under control of said analyzing means for operating said accumulator to enter therein groups of serial numbers, one at a time in numerical order, means for adding a unit to the serial number first added in said accumulator, means cooperating with said accumulator for subtracting the number following said first serial number from the sum in said accumulator, commutator brushes adjusted by said wheels, a pair of commutator spots for each wheel upon which the brushes rest after addition and subtraction when successive numbers are consecutive, a magnet in series with wiring connecting said spots in a circuit which is opened when successive numbers are not consecutive, and means effective when said magnet is deenergized for controlling the operation of the machine.

8. In a machine controlled by records with indicia representing groups of serial numbers arranged in numerical order, means for analyzing said indicia on said records, a pair of adding means under control of said anaylzing means for alternately receiving successively analyzed serial numbers, means for connecting said adding means alternately to said analyzing means, subtracting devices cooperating with said adding means and made alternately effective therewith by said connecting means, a device cooperating with said pair of adding means for sensing the condition of said adding means after addition and subtraction and thus determining whether successively analyzed numbers are in serial order, another device cooperating with said analyzing means to determine whether the numbers of successive records are identical, means under control of said analyzing means and said serial order determining device for printing the first number of each group, accumulating means including unit adding devices, means under control of said analyzing means for operating said accumulating means to add the first serial number of a group, means for operating said unit adding devices to add a unit for each record sensing cycle, means under control of said accumulating means and said serial order determining device for printing the last number of each group of numbers on records in serial order, a sign printing device, and means under control of said identity determining device for operating said sign printing device when two successive numbers are identical.

9. In a machine controlled by records with indicia representing groups of serial numbers, said records being arranged in numerical order, means for sensing the indicia on the records, an accumulator comprising a plurality of adding wheels, means under control of said sensing means for adding a sensed serial number in said accumulator, means for adding a unit to the serial number in said accumulator, means cooperating with said accumulator for adding the nines complement of the number following said serial number to the sum in said accumulator, commutator brushes adjusted by said wheels, a pair of commutator spots for each wheel upon which the brushes rest after addition and subtraction when successive numbers are consecutive, a magnet in series with wiring connecting said spots in a circuit which is opened when successive records bear indicia representing numbers that are not consecutive, means effective when said magnet is deenergized for controlling the operation of the machine and means for adding an elusive unit in said accumulator to restore the accumulator when the two serial numbers entered therein differ by unity.

10. In a machine controlled by records with indicia representing groups of serial numbers, said records being arranged in numerical order, means for sensing the indicia on said records, a pair of accumulators, number adding devices cooperating with said accumulators and operated under control of said sensing means, unit adding devices cooperating with said number adding devices, subtracting devices cooperating with said number adding devices, and automatic cyclical control means for controlling the operation of the devices cooperating with the accumulator; first to condition the number and unit adding devices automatically for operation when the indicia of the first serial number is sensed and entered in one of the accumulators, and second, to condition the subtracting devices automatically for operation when the second serial number is sensed and entered into said one accumulator as the other accumulator is operated for number and unit addition, means under control of said accumulator for determining when said first and second numbers are not in serial order, serial number printing devices, means cooperating with said analyzing means for adjusting said devices to represent first and last serial numbers of serial record groups, and means under control of said determining means for initiating operation of said printing devices to print the number of the last serial record of one group and the number of the first serial record of the next group.

11. In a machine controlled by record cards perforated to represent groups of serial numbers arranged in numerical order, each card representing a number which is entered in one cycle of operation of the machine, means for analyzing said cards one at a time, a pair of accumulators, means under control of the analyzing means for selectively adding or subtracting said numbers in said accumulators, an alternating means for controlling said selective means to add a number in one accumulator and add the nines complement of the same number in the other accumulator and then on the next cycle add the nines complement of the next number in said one accumulator and add said next number in said other accumulator, means under control of said alternating means for adding a unit in the accumulator operated in addition to enlarge the number therein equal to the next serial number, means under control of said alternating means for testing the amount representing position of an accumulator after the subtracting operation to determine if the two serial numbers entered therein differ by unity, means operated under control of said testing means when said two serial numbers do not differ by unity to print the last number analyzed which is the last serial number of a group and means for adding an elusive unit into the accumulator operated in subtraction to restore the accumulator when the two serial numbers entered therein differ by unity.

12. In a machine controlled by groups of serially numbered records with indicia thereon representing said serial numbers on the records, said records being arranged in numerical order, means for feeding said records in succession, means for sensing the indicia representing said serial numbers on the records, means under control of said sensing means for detecting when any of said sensed indicia representing successive numbers are not in serial order denoting a change in the serial record groups, means under control of said sensing means for printing the first serial number of each serial record group, means under control of said sensing means for adding the first serial number of each group and including means for forming the last serial number of each group, means under control of said adding means and said detecting means for printing the last serial number of each serial record group, means for counting the number of serial number records in the serial groups, and means under control of said counting means for printing a total count of the serial number records.

13. In a machine controlled by records presented in numerical order each containing indicia representing a serial number, means for analyzing said indicia on the records, means for feeding said records in succession, a pair of accumulator devices, means under control of said analyzing means for operating said accumulator devices to add serial numbers therein, unit adding devices cooperating with said accumulator devices, subtracting devices cooperating with said accumulator devices and said analyzing means, and automatic cyclical control means cooperating with the devices associated alternately with the accumulator devices; first to condition the operating means and unit adding devices automatically for operation in association with one accumulator device when the first record is analyzed, and second, to condition the subtracting devices automatically for operation when the number analyzed on the second record is subtractively entered into said one accumulator device as the other accumulator device is operated for number and unit addition, and means under control of said accumulator devices for indicating when said first and second records are not in serial order.

WILLIAM W. McDOWELL.